United States Patent
Desai et al.

(10) Patent No.: US 9,621,574 B2
(45) Date of Patent: Apr. 11, 2017

(54) OUT OF BAND END USER NOTIFICATION SYSTEMS AND METHODS FOR SECURITY EVENTS RELATED TO NON-BROWSER MOBILE APPLICATIONS

(71) Applicants: Purvi Desai, Cupertino, CA (US); Abhinav Bansal, Jalandhar (IN); Vikas Mahajan, Ludhiana (IN)

(72) Inventors: Purvi Desai, Cupertino, CA (US); Abhinav Bansal, Jalandhar (IN); Vikas Mahajan, Ludhiana (IN)

(73) Assignee: Zscaler, Inc., San Jose, CA (US)

( * ) Notice: Subject to any disclaimer, the term of this patent is extended or adjusted under 35 U.S.C. 154(b) by 240 days.

(21) Appl. No.: 14/461,790

(22) Filed: Aug. 18, 2014

(65) Prior Publication Data

US 2016/0050227 A1 Feb. 18, 2016

(51) Int. Cl.
*H04L 29/06* (2006.01)
*H04W 12/06* (2009.01)
*H04L 12/58* (2006.01)

(52) U.S. Cl.
CPC .......... *H04L 63/1441* (2013.01); *H04L 63/08* (2013.01); *H04L 63/104* (2013.01); *H04L 63/145* (2013.01); *H04L 63/1408* (2013.01); *H04L 63/1425* (2013.01); *H04W 12/06* (2013.01); *H04L 51/12* (2013.01); *H04L 63/045* (2013.01); *H04L 63/308* (2013.01)

(58) Field of Classification Search
CPC ... H04L 63/104; H04L 63/08; H04L 63/1408; H04L 63/1441; H04L 63/1425; H04L 63/145; H04L 63/308; H04L 51/12; H04L 63/045; H04W 12/06
See application file for complete search history.

(56) References Cited

U.S. PATENT DOCUMENTS

| | | | |
|---|---|---|---|
| 2008/0082662 A1* | 4/2008 | Dandliker | H04L 63/10 709/225 |
| 2010/0251329 A1* | 9/2010 | Wei | H04L 63/1408 726/1 |
| 2013/0268357 A1* | 10/2013 | Heath | H04L 63/00 705/14.53 |
| 2015/0172321 A1* | 6/2015 | Kirti | H04L 63/1416 726/1 |

* cited by examiner

*Primary Examiner* — Amir Mehrmanesh
(74) *Attorney, Agent, or Firm* — Clements Bernard Walker PLLC; Lawrence A. Baratta, Jr.; Christopher L. Bernard

(57) ABSTRACT

A cloud based security method includes authenticating a mobile device through a cloud based security system; associating the mobile device with a user of the cloud based security system based on the authenticating; monitoring user requests from the mobile device by the cloud based security system; detecting security threats based on the monitoring; and sending an out of band end user notification to the mobile device responsive to detecting a security threat, wherein the out of band end user notification comprises information for the user related to the security threat.

12 Claims, 11 Drawing Sheets

OUT OF BAND END USER NOTIFICATION SYSTEMS AND METHODS FOR SECURITY EVENTS RELATED TO NON-BROWSER MOBILE APPLICATIONS

CROSS-REFERENCE TO RELATED APPLICATIONS

This application is a continuation-in-part of co-pending U.S. patent application Ser. No. 13/446,856 filed Apr. 13, 2012, and entitled "ARCHIVING SYSTEMS AND METHODS FOR CLOUD BASED SYSTEMS," the contents of which are incorporated in full by reference herein.

FIELD OF THE INVENTION

Generally, the field of art of the present disclosure pertains to computer and network systems and methods, and more particularly, to out of band end user notification systems and methods for security events related to non-browser mobile applications.

BACKGROUND OF THE INVENTION

Conventionally in network security systems, web security solutions send a Hypertext Transfer Protocol (HTTP) response with a relevant message when a transaction is blocked, cautioned, etc. For example, the relevant message explains to the end user the circumstances the leads the web security solutions to block, caution, etc. the transaction. This approach works well for browsers where browsers can display the HTTP response message. Of note, with mobile devices, various applications ("apps") are used for content, etc. This same approach does not work well for applications which most of the time do not display the HTTP response pages. For example, mobile apps use HTTP for application logic and their rendering of the message is based of application logic. For example, Facebook would show status updates and Box would show file listings. However, most mobile apps do not have an ability to display the HTTP response message where a web security solution blocks, cautions, etc. a transaction. Here, the transaction may be blocked and the end user is unaware.

BRIEF SUMMARY OF THE INVENTION

In an exemplary embodiment, a cloud based security method includes authenticating a mobile device through a cloud based security system; associating the mobile device with a user of the cloud based security system based on the authenticating; monitoring user requests from the mobile device by the cloud based security system; detecting security threats based on the monitoring; and sending an out of band end user notification to the mobile device responsive to detecting a security threat, wherein the out of band end user notification includes information for the user related to the security threat.

In yet another exemplary embodiment, a cloud based security system includes a central authority (CA) server, a cloud node (CN), and a delegate server communicatively coupled to a mobile operating system notification system, wherein each of the one or more CA servers, the one or more cloud nodes, and the delegate server are communicatively coupled to one another; wherein the cloud node is configured to authenticate a mobile device, wherein the CA server is configured to associate a user of mobile device based on authentication; wherein the cloud node is configured to monitor user requests from the mobile device and detect security threats based on monitoring, and upon detecting a security threat, the cloud node provides a request to the delegate; and wherein the delegate, responsive to the request, sends an out of band end user notification to the mobile device via the mobile operating system notification system, wherein the out of band end user notification includes information for the user related to the security threat.

In yet another exemplary embodiment, a mobile device includes a network interface communicatively coupled to a user and an external network; a processor; and memory storing computer executable instructions, and in response to execution by the processor, the computer executable instructions cause the processor to perform steps of: operate a secure agent associated with a cloud based security system; operate a mobile device application unable to display Hypertext Transfer Protocol (HTTP) responses for an end user notification; authenticate with the cloud based security system; and receive the end user notification out of band from a mobile operating system notification system responsive to the cloud based security system detecting a security threat with the mobile device application.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, out of band end user notification systems and methods are described for security events related to non-browser mobile applications. The out of band end user notification systems and methods associate a device to the end user and sends a notification message to the end user whenever applications are blocked or cautioned due to security policy. This notification message has details such as "Reasons for block," "User name," "Application blocked," "Blocked Uniform Resource Locator (URL)," "Time of block," etc. The out of band end user notification systems and methods overcome one of the biggest User experience problem for non-browser applications and enforcing security policy on those app transactions, namely that there is no good way for the end user to know if an app is getting blocked by security system or it is hanging due to network issue or due to server issues. So it is frustrating at best for the end user and it could lead to a lot of support calls and poor user experiences. The out of band end user notification systems and methods provide an out of band message to end user whenever an app is blocked, cautioned, etc. This improves simplified user experience and reduces support calls.

Additionally, in various exemplary embodiments, archiving systems and methods are described that archive web content without storing private data in a cloud based security system. Specifically, the archiving systems and methods can support large number of web transactions making relevant data available for review without storing it outside an organization's data privacy perimeter. The archiving systems and methods enable archiving of Web content without violating an organization's data privacy rules. In an exemplary embodiment, the archiving systems and methods archive content using email where email with web content and related security incident information is securely sent to an organization's Mail server for storage locally in the organization's domain and not in the cloud based system. The archiving systems and methods can apply security rules to incoming data based on results of a security analysis. If the rules request archiving, the archiving systems and methods can construct an email with Meta information of the web transaction, its data, and security incident information, and send the email to the email address as requested by the Auditor of the Security policy. Thus, Web transaction content is not stored in the cloud. In order to ensure data privacy, an encrypted channel can be used for sending this email notification. Subsequently, the archiving systems and methods enable a representative of the organization to review the security incidents and ascertain the event using proof received in email, without compromising on the organization's data privacy policy.

§1.0 Example High Level System Architecture—Cloud-Based Security System

Figure 1:
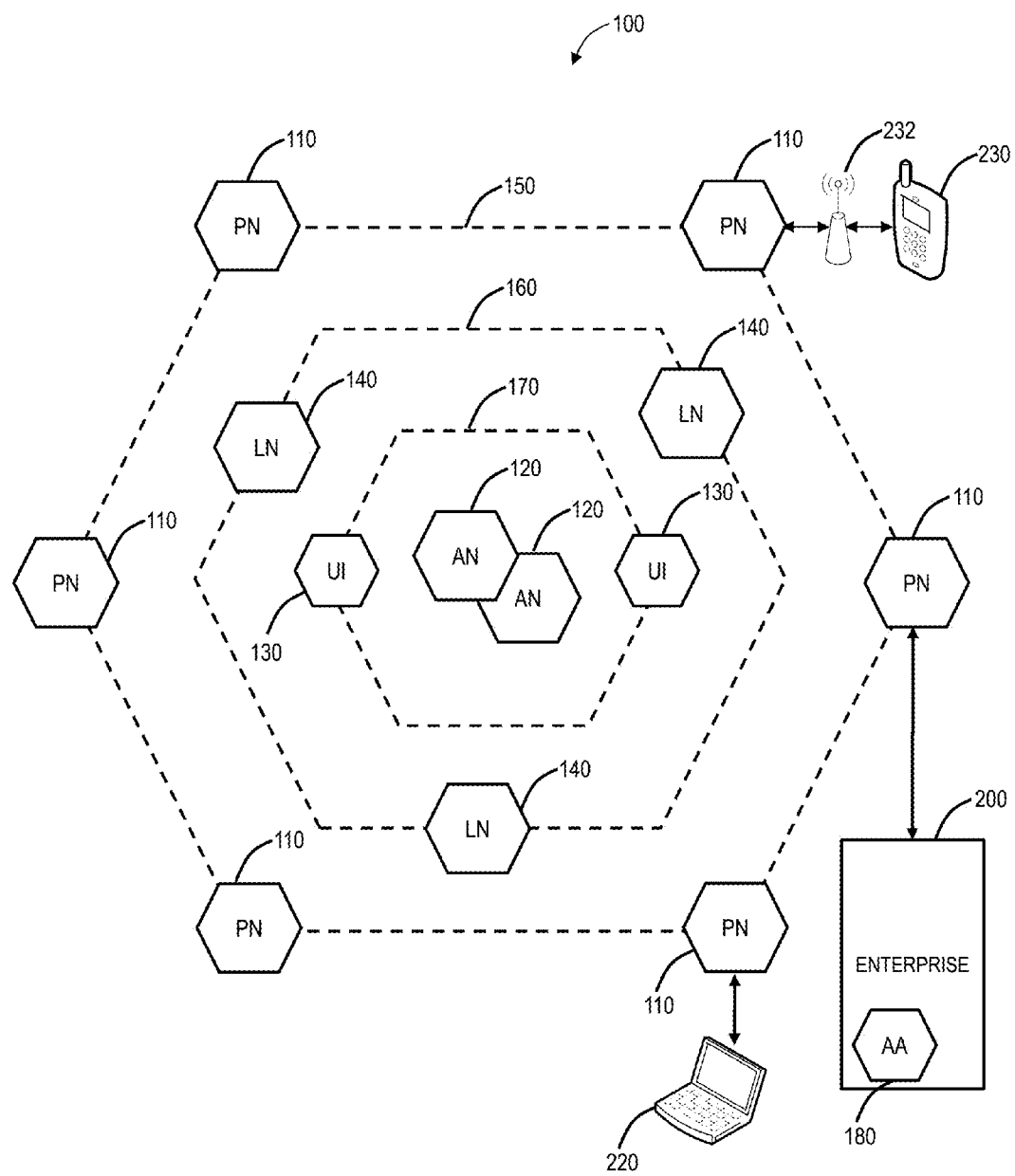
FIG. 1 is a network diagram of a distributed security system that is a cloud system and which can implement archiving systems and methods.

Referring to FIG. 1, in an exemplary embodiment, a block diagram illustrates a distributed security system 100. The system 100 can, for example, be implemented as an overlay network in a wide area network (WAN), such as the Internet, a local area network (LAN), or the like. Also, the system 100 can utilize the archiving systems and methods described herein. The system 100 includes content processing nodes, processing nodes 110, that proactively detect and preclude the distribution of security threats, e.g., malware, spyware, viruses, trojans, botnets, email spam, data leakage, policy violations, etc., and other undesirable content sent from or requested by an external system. Example external systems can include an enterprise 200, a computer device 220, and a mobile device 230, or any other network and computing systems communicatively coupled to the system 100. In an exemplary embodiment, each of the processing nodes 110 cam include a decision system and method, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, spam email, unknown, data leakage, policy violation, etc. For example, the output of each element of the decision vector D can be based on the output of one or more data inspection engines. In an exemplary embodiment, the threat classification can be reduced to a subset of categories e.g., violating, non-violating, neutral, unknown. Based on the subset classification, the processing node 110 can allow distribution of the content item, preclude distribution of the content item, allow distribution of the content item after a cleaning process, or perform threat detection on the content item. In an exemplary embodiment, the actions taken by one of the processing nodes 110 can be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
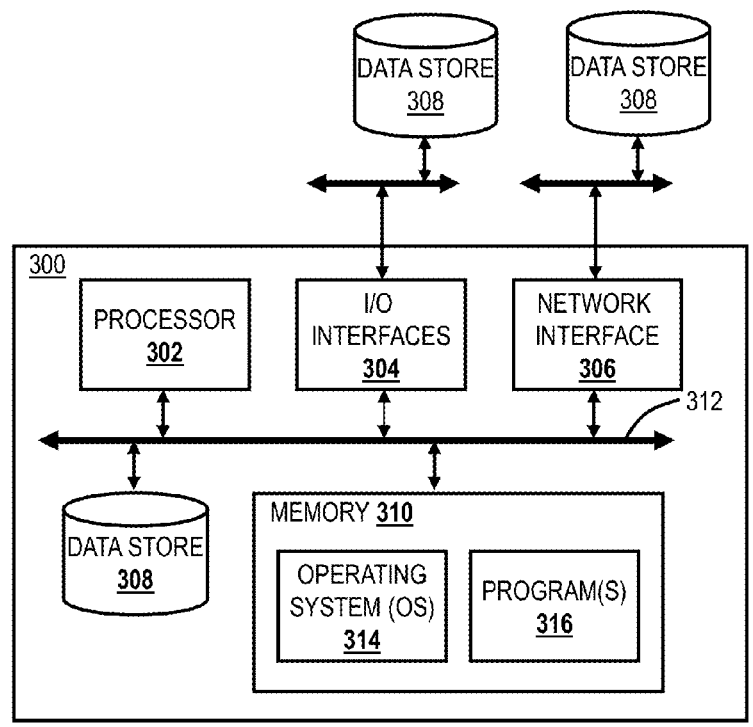
FIG. 3 is a block diagram of a server which may be used in the distributed security system of FIG. 1 or with any other cloud-based system.

Each of the processing nodes 110 can be implemented by one or more of computer and communication devices, e.g., server computers, gateways, switches, etc., such as the server 300 described in FIG. 3. In an exemplary embodiment, the processing nodes 110 can serve as an access layer 150. The access layer 150 can, for example, provide external system access to the security system 100. In an exemplary embodiment, each of the processing nodes 110 can include Internet gateways and one or more servers, and the processing nodes 110 can be distributed through a geographic region, e.g., throughout a country, region, campus, etc. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 can have multiple routers, switches, etc. that are used to communicate over the Internet, and the routers, switches, etc. can be configured to establish communications through the nearest (in traffic communication time or geographically, for example) processing node 110. A mobile device 230 can be configured to communicated to a nearest processing node 110 through any available wireless access device, such as an access point, high-speed wireless access, or a cellular gateway. A single computer device 220, such as a user's personal computer, can have its browser and email program configured to access the nearest processing node 110, which, in turn, serves as a proxy for the computer device 220. Alternatively, an Internet provider can have all of its customer traffic processed through the processing nodes 110.

In an exemplary embodiment, the processing nodes 110 can communicate with one or more authority nodes (AN) 120. The authority nodes 120 can store policy data for each external system and can distribute the policy data to each of the processing nodes 110. The policy can, for example, define security policies for a protected system, e.g., security policies for the enterprise 200. Example policy data may define access privileges for users, web sites and/or content that is disallowed, restricted domains, acceptable use, data leakage prevention, etc. The authority nodes 120 can distribute the policy data to the processing nodes 110. In an exemplary embodiment, the authority nodes 120 can also distribute threat data that includes the classifications of content items according to threat classifications, e.g., a list of known viruses, a list of known malware sites, spam email domains, a list of known phishing sites, list of data leakage prevention terms, etc. The distribution of threat data between the processing nodes 110 and the authority nodes 120 can implemented by push and pull distribution schemes described in more detail below. In an exemplary embodiment, each of the authority nodes 120 can be implemented by one or more computer and communication devices, e.g., server computers, gateways, switches, etc., such as the server 300 described in FIG. 3. In some exemplary embodiments, the authority nodes 120, the logging nodes 140, and user interface (UI) front-ends 130 can serve as an application layer 160. The application layer 160 can, for example, manage and provide policy data, threat data, and data inspection engines and dictionaries for the processing nodes 110.

Other application layer functions can also be provided in an application layer 170, such as the user interface (UI) front-end 130. The user interface front-end 130 can provide a user interface through which users of the external systems can provide and define security policies, e.g., whether email traffic is to be monitored, whether certain web sites are to be precluded, etc. Another application capability that can be provided through the user interface front-end 130 is security analysis and log reporting. The underlying data on which the security analysis and log reporting functions operate are stored in logging nodes (LN) 140, which serve as a data logging layer, i.e. the application layer 160 can be referred to as the data logging layer. Each of the logging nodes 140 can store data related to security operations and network traffic processed by the processing nodes 110 for each external system. In an exemplary embodiment, the logging node 140 data can be anonymized so that data identifying an enterprise is removed or obfuscated. For example, identifying data can be removed to provide an overall system summary of security processing for all enterprises and users without revealing the identity of any one account. Alternatively, identifying data can be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data can be further encrypted, e.g., so that only the enterprise (or user if a single user account) can have access to the logging node 140 data for its account. Other processes of anonymizing, obfuscating, or securing logging node 140 data may also be used. As is described herein, the archiving systems and methods can be implemented with the processing nodes 110, the authority nodes, and the logging nodes 140 to ensure that no private data is stored in the system 100.

In an exemplary embodiment, an access agent 180 can be included in the external systems. For example, the access agent 180 is deployed in the enterprise 200. The access agent 180 can, for example, facilitate security processing by providing a hash index of files on a client device to one of the processing nodes 110, or can facilitate authentication functions with one of the processing nodes 110, e.g., by assigning tokens for passwords and sending only the tokens to a processing node so that transmission of passwords beyond the network edge of the enterprise is minimized. Other functions and processes can also be facilitated by the access agent 180. In an exemplary embodiment, the processing node 110 can act as a forward proxy that receives user requests to external servers addressed directly to the processing node 110. In another exemplary embodiment, the processing node 110 can access user requests that are passed through the processing node 110 in a transparent mode. A protected system, e.g., enterprise 200, can, for example, choose one or both of these modes. For example, a browser can be configured either manually or through the access agent 180 to access the processing node 110 in a forward proxy mode. In the forward proxy mode, all accesses are addressed to the processing node 110.

In an exemplary embodiment, an enterprise gateway can be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols can be used. In another exemplary embodiment, the processing nodes can may be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise the access agent 180 can be configured to perform MPLS labeling. In another transparent proxy mode exemplary embodiment, a protected system, such as the enterprise 200, can identify the processing node 110 as a next hop router for communication with the external servers.

Generally, the distributed security system 100 is an exemplary cloud based system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud based system, and those of ordinary skill in the art will recognize the archiving systems and methods contemplate operation on or with any cloud based system.

Operationally, the system 100 can provide policy-based, secure Internet access for any device, anywhere. The system 100 can be viewed as a cloud based security system. Traditionally, security was delivered as software which was installed on servers. Installation and deployment required time and expertise, prompting the migration to appliances. While the hardware simply plugs into existing infrastructures, multiple appliances must be installed at each gateway and an assortment of point products must be used to provide comprehensive security. Managing multiple user interfaces, policy managers, and log files is expensive, inefficient, and incomplete. In contrast, the system 100 provides SaaS, or cloud-delivered, security services. By analogy, rather than cleaning one's own water, one prefers water delivered through a tap on-demand; rather than generating one's own power, one prefers power delivered through power lines on-demand. In the same way, appliances are giving way to security as a service.

Using the system 100, IT administrators or the like define policies and simply forward corporate Internet traffic to the system 100. The system 100 allows or blocks the traffic and can be used for all users, including the enterprise 200, the computer device 220, and the mobile device 230. The enterprise 200 can include an organization's home and regional offices, the computer device 220 and the mobile device 230 can include road warriors, mobile phone users, home-based employees, etc. Specifically, users such as the enterprise 200, the computer device 220, and the mobile device 230 are all accessing external systems, e.g. the Internet, by way of the system 100, i.e. through one of the processing nodes 110. As such, security for the users 200, 220, 230 is pervasive and always present. There is no capital expenditure as investments are not required for either hardware or software at the users 200, 220, 230. SaaS and the system 100 frees precious IT resources from performing operational security chores of managing and patching boxes, and updating data feeds and signatures. It enables IT to focus on strategic security such as policy and architecture.

§2.0 Example Detailed System Architecture and Operation

Figure 2:
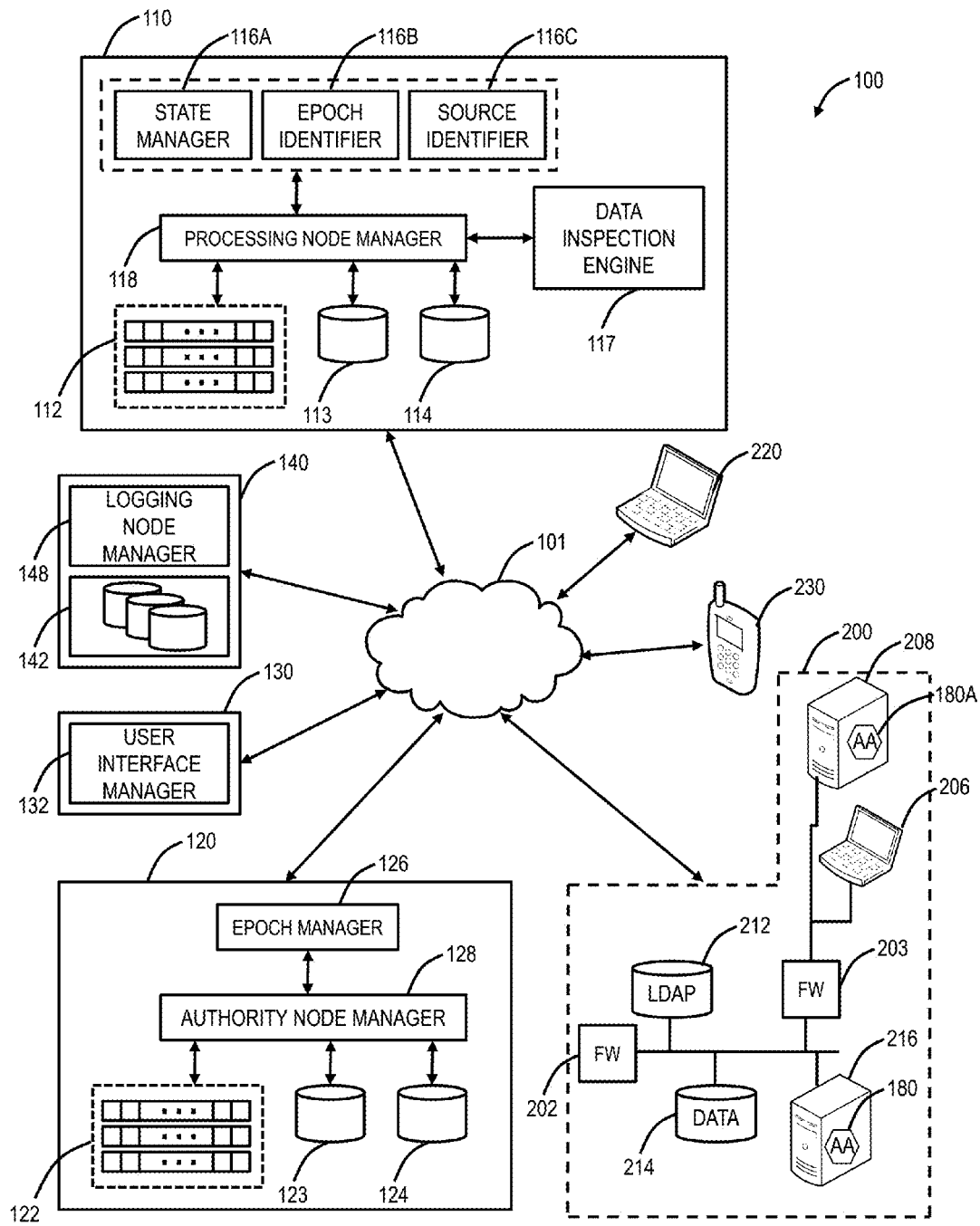
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there can be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers, i.e. any content on any network. Some or all of the data communication of each of the external systems 200, 220 and 230 may be processed through the processing node 110.

FIG. 2 also shows the enterprise 200 in more detail. The enterprise 200 can, for example, include a firewall (FW) 202 protecting an internal network that may include one or more enterprise servers 216, a lightweight directory access protocol (LDAP) server 212, and other data or data stores 214. Another firewall 203 can protect an enterprise subnet that can include user computers 206 and 208 (e.g., laptop and desktop computers). The enterprise 200 can communicate with the WAN 101 through one or more network devices, such as a router, gateway, switch, etc. The LDAP server 212 can store, for example, user login credentials for registered users of the enterprise 200 system. Such credentials can include a user identifiers, login passwords, and a login history associated with each user identifier. The other data stores 214 can include sensitive information, such as bank records, medical records, trade secret information, or any other information warranting protection by one or more security measures.

In an exemplary embodiment, a client access agent 180*a* can be included on a client computer 208. The client access agent 180*a* can, for example, facilitate security processing by providing a hash index of files on the user computer 208 to a processing node 110 for malware, virus detection, etc. Other security operations can also be facilitated by the access agent 180*a*. In another exemplary embodiment, a server access agent 180 can facilitate authentication functions with the processing node 110, e.g., by assigning tokens for passwords and sending only the tokens to the processing node 110 so that transmission of passwords beyond the network edge of the enterprise 200 is minimized. Other functions and processes can also be facilitated by the server access agent 180*b*. The computer device 220 and the mobile device 230 can also store information warranting security measures, such as personal bank records, medical information, and login information, e.g., login information to the server 206 of the enterprise 200, or to some other secured data provider server.

§2.1 Example Processing Node Architecture

In an exemplary embodiment, the processing nodes 110 are external to network edges of the external systems 200, 220 and 230. That is, the processing nodes 110 are connected to the external systems 200, 220 and 230, and not physically part thereof. For example, the processing nodes 110 could be located at data centers and the like and the external systems 200, 220 and 230 can connect to the processing nodes 110 through various networks over various network connectivity types (e.g., wireless, wired). Each of the processing nodes 110 stores security policies 113 received from the authority node 120 and monitors content items requested by or sent from the external systems 200, 220 and 230. In an exemplary embodiment, each of the processing nodes 110 can also store a detection process filter 112 and/or threat data 114 to facilitate the decision of whether a content item should be processed for threat detection. A processing node manager 118 can manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 can include a state manager 116A. The state manager 116A can be used to maintain the authentication and the authorization states of users that submit requests to the processing node 110. Maintenance of the states through the state manager 116A can minimize the number of authentication and authorization transactions that are necessary to process a request. An example of this state management is described in commonly assigned U.S. patent application Ser. No. 12/179,377, filed Jul. 24, 2008, and entitled "HTTP AUTHENTICATION AND AUTHORIZATION MANAGEMENT," the contents of which are incorporated by reference herein. The processing node 110 can also include an epoch processor 116B. The epoch processor 116B can be used to analyze authentication data that originated at the authority node 120. The epoch processor 116B can use an epoch ID to further validate the authenticity of authentication data. The processing node 110 can further include a source processor 116C. The source processor 116C can be used to verify the source of authorization and authentication data. The source processor 116C can identify improperly obtained authorization and authentication data, enhancing the security of the network. Collectively, the state manager 116A, the epoch processor 116B, and the source processor 116C operate as data inspection engines.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 can identify the Uniform Resource Locator (URL) address of URL requests as the information key and hash the URL address; or can identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances can include, for example, whether a given file has been virus scanned, whether content at a given URL has been scanned for inappropriate (e.g., pornographic) content, whether a given fingerprint matches any of a set of stored documents, whether data contains data leakage prevention terms, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 can be distributed to the processing nodes 110, which then store a local copy of the detection processing filter 112.

In an exemplary embodiment, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. In an exemplary embodiment, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc. The authority node 120 can also store master threat data 124. The master threat data 124 can classify content items by threat classifications, e.g., a list of known viruses, a list of known malware sites, spam email domains, list of known or detected phishing sites, data leakage terms, etc. The authority node manager 128 can be used to manage the master threat data 124, e.g., receive updates from the processing nodes 110 when one of the processing nodes 110 has processed a content item and update the master threat data 124 with any pertinent results. In some implementations, the master threat data 124 can be distributed to the processing nodes 110, which then store a local copy of the threat data 114. In another exemplary embodiment, the authority node 120 can also monitor the health of each of the processing nodes 110, e.g., the resource availability in each of the processing nodes 110, detection of link failures, etc. Based on the observed health of each of the processing nodes 110, the authority node 120 can redirect traffic among the processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data 114, then the processing node manager 118 can cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 can automatically transmit the updated threat data to the other processing nodes 110. Accordingly, threat data for new threats as the new threats are encountered are automatically distributed to each processing node 110. Upon receiving the new threat data from the authority node 120, each of processing node managers 118 can store the updated threat data in the locally stored threat data 114. In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data, then the processing node manager 118 can request responsive threat data for the content item from the authority node 120. Because processing a content item can consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 112 and the classification of the content item. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the content item is classified by the threat data 114, then the processing node manager 118 can manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, can update the master threat data 124 and the master detection process filter 122 stored in the authority node data store according to the threat data update received from the processing node 110. In an exemplary embodiment, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114. In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated herewith. The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§3.0 Exemplary Server Architecture

Referring to FIG. 3, in an exemplary embodiment, a block diagram illustrates a server 300 which can be used in the system 100 or standalone. Any of the processing nodes 110, the authority nodes 120, and the logging nodes 140 can be formed through one or more servers 300. Further, the computer device 220, the mobile device 230, the servers 208, 216, etc. can include the server 300 or a similar structure. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 101, the enterprise 200, and the like, etc. The network interface 306 can include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 can be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), Apple OS X and variants thereof (available from Apple, Inc. of Cupertino, Calif.), or the like. The one or more programs 316 may be configured to implement the various processes, algorithms, methods, techniques, etc. described herein.

§4.0 Exemplary Mobile Device Architecture

Figure 4:
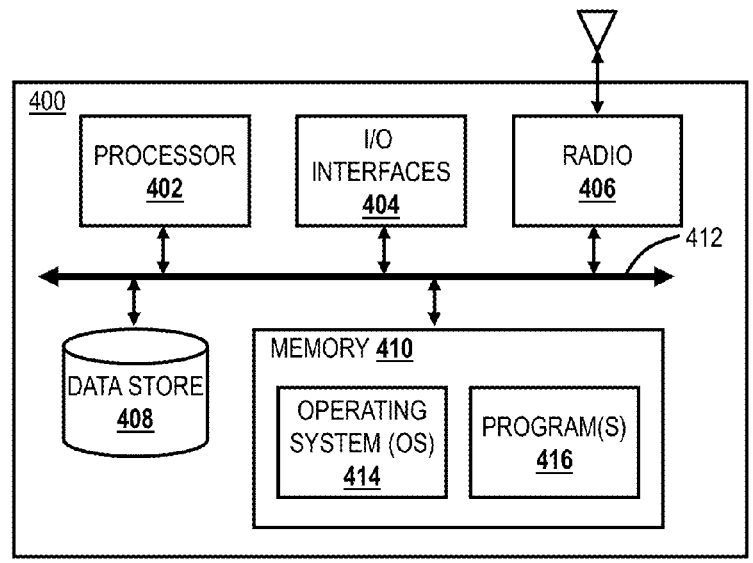
FIG. 4 is a block diagram of a mobile device which may be used in the distributed security system of FIG. 1 or with any other cloud-based system.

Referring to FIG. 4, in an exemplary embodiment, a block diagram illustrates a mobile device 400, which can be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 412 is configured to execute software stored within the memory 422, to communicate data to and from the memory 422, and to generally control operations of the mobile device 400 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The operating system 426 can be any of LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 428 can include various applications, add-ons, etc. configured to provide end user functionality with the mobile device 400. For example, exemplary programs 428 can include, but not limited to, a web browser, social networking applications, streaming media applications, games, mapping and location applications, electronic mail applications, financial applications, and the like.

§5.0 Exemplary General Cloud System

Figure 5:
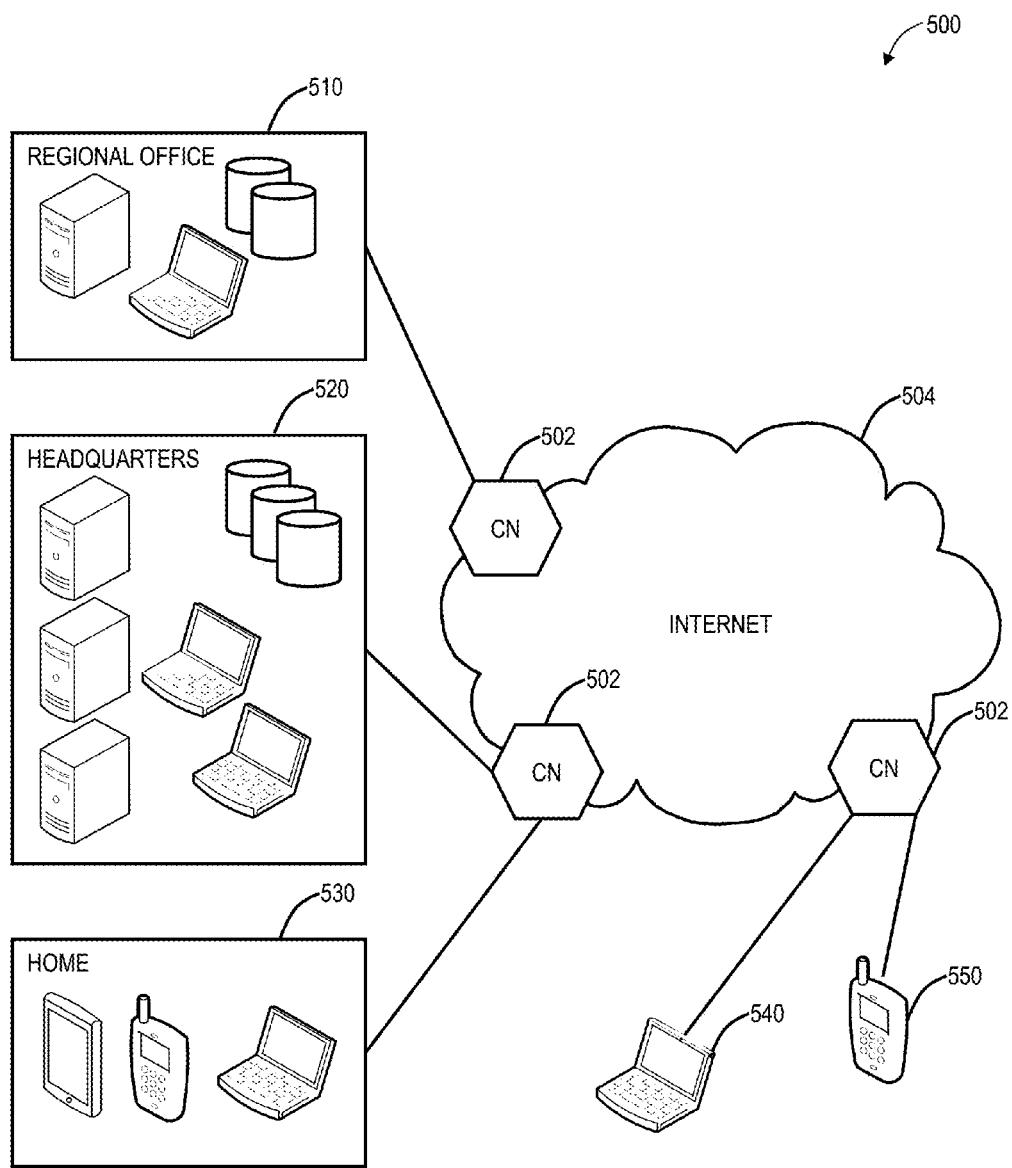
FIG. 5 is a network diagram of another cloud system which can implement the archiving systems and methods.

Referring to FIG. 5, in an exemplary embodiment, another exemplary cloud system 500 is illustrated for the archiving systems and methods and the like. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, a mobile laptop 540, and a mobile device 550 is redirected to the cloud through the cloud nodes 502. That is, each of the locations 510, 520, 530, 540, 550 is communicatively coupled to the Internet 504 through the cloud nodes 502. The cloud system 500 can be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 can be viewed as Security-as-a-Service through the cloud.

Architecturally, the systems 100, 500 generally at least include the processing nodes 110 and the cloud nodes 502 for interfacing with the users 200, 220, 230, 510, 520, 530, 540, 550. In an exemplary embodiment, all functions described herein can be incorporated in the processing nodes 110 and the cloud nodes 502. In another exemplary embodiment, the functions can be distributed. For example, the system 500 includes the singular cloud nodes 502 while the system 100 includes the processing nodes 110, the authority nodes 120, the logging nodes 140, etc. The term node as used herein can be a single computer, cluster of servers, or a functional module running on a computer, server, etc. The archiving systems and methods can be implemented generally by the distributed security system 100 and/or the cloud system 500. For example, the archiving systems and methods can affect the processing nodes 110, the authority nodes 120, the user interface front-end 130, and the logging nodes 140 to ensure data archiving adheres to data protection policies of an organization using the system 100. Alternatively, the archiving systems and methods can affect the cloud nodes 502 ensuring that any data storage thereon adheres to data protection policies of an organization using the system 500.

§6.0 Web Transaction Archiving System

Figure 6:
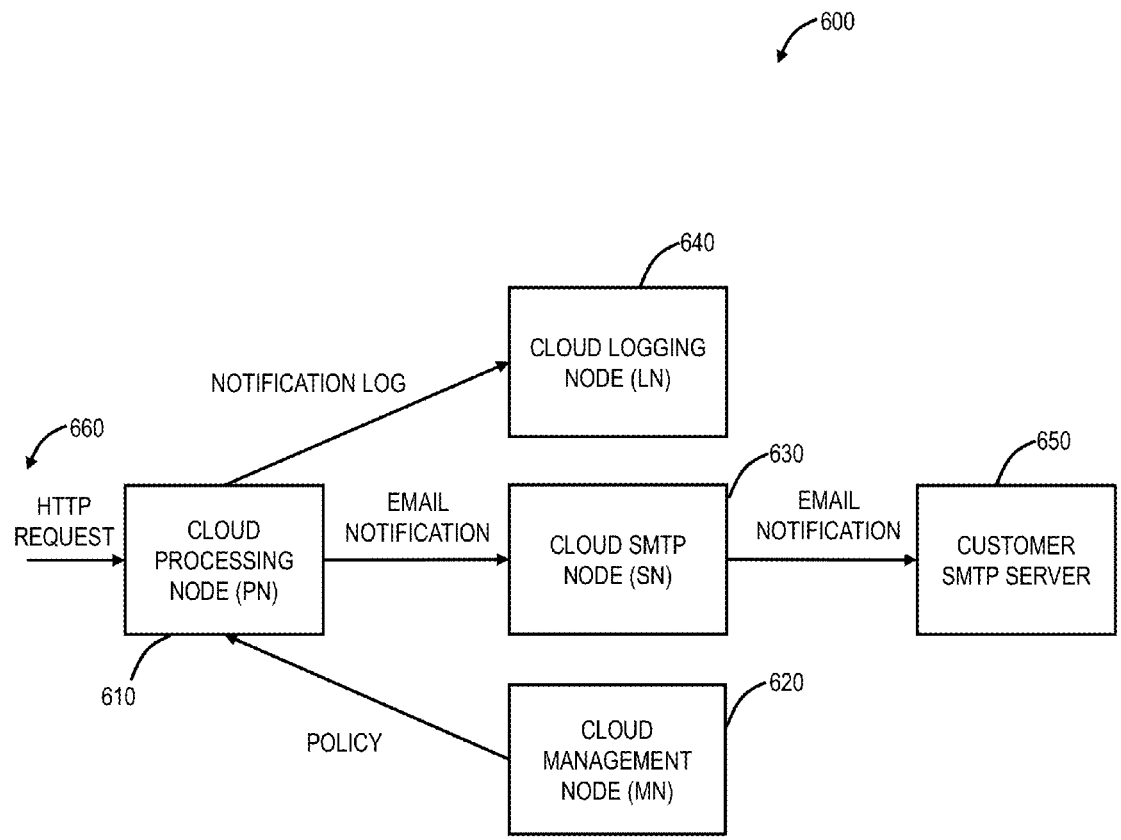
FIG. 6 is a functional block diagram of a web transaction archiving system.

Referring to FIG. 6, in an exemplary embodiment, a functional block diagram illustrates a web transaction archiving system 600. The archiving system 600 can be based on the systems 100, 500, or another type of system. That is, the archiving system 600 can operate on any cloud system handling web or any other data transactions. The archiving system 600 includes a cloud processing node 610, a cloud management node 620, a cloud Simple Mail Transfer Protocol (SMTP) node 630, a cloud logging node 640, and a customer SMTP server 650. In an exemplary embodiment, the cloud processing node 610 can be the processing node 110 or the cloud node 502, the cloud management node 620 can be the authority node 120 or part of the cloud node 502, and the logging node 640 can be the logging node 140 or part of the cloud node 502. The cloud SMTP node 630 can be part of any of the logging node 140, the processing node 110, the authority node 120, the cloud node 502, or a standalone device. Collectively, the nodes 610, 620, 630, 640 are part of a cloud system, i.e. the system 100, 500, etc. The customer SMTP server 650 is a mail server located within an organization's administrative domain. For example, in FIG. 2, the customer SMTP server 650 could be within the enterprise 200 behind the firewalls 202, 203.

In operation, the cloud processing node 610 interfaces to end users 660, such as receiving HTTP requests or any other data (e.g., collectively referred to as web transactions). The cloud processing node 610 is configured to perform the various functions described herein for the processing node 110 and the cloud node 502. That is, the cloud processing node 610 can perform data analysis on any requests to/from the end users. In context of this data analysis, the archiving systems and methods seek to avoid storing any private data associated with the organization within the confines of the cloud. The cloud processing node 610 performs the data analysis based on policy information provided by the cloud management node 620 (i.e., previously provided, provided on-demand, etc.). Part of this policy information can include archiving rule for specific security policies. Exemplary archiving rules can include, without limitation, not storing data related to a security incident event (e.g., a data leakage event, etc.), not storing data related to accessing certain Web sites, not storing data related to specific users, etc. Through the cloud management node 620, the archiving rules can be modified as needed by an IT representative of an organization. The cloud logging node 640 is used for storing notification logs related to the data analysis. In an exemplary embodiment, the cloud logging node 640 can store a log entry for any event detected at the cloud processing node 610. However, the data in the log entry can be based on the archiving rules. For example, a security incident event could just denote the specifics of the event without storing the associated data at the cloud logging node 640.

The cloud SMTP node 630 is configured to handle archiving of data when there is an archiving rule in place. The cloud SMTP node 630 is configured to receive a notification when there is an event and an archiving rule in place. For example, assuming the cloud SMTP node 630 is separated from the cloud processing node 610, the cloud SMTP node 630 can receive an email notification from the cloud processing node 610. Alternatively, the cloud SMTP node 630 can be part of the cloud processing node 610, i.e. part of the processing node 110, the cloud node 502, etc., and in this exemplary embodiment, the cloud processing node 610 can simply internally notify the cloud SMTP node 630. The cloud SMTP node 630 is configured to compose an email to the customer SMTP server 650 based on the archiving rule and to securely transmit the email to the customer SMTP server 650. Subsequent to the email transmission, the cloud, i.e. the nodes 610, 620, 630, 640, no longer has the data related to the event. The data is securely within the organization's domain in the customer SMTP server 650. The customer SMTP server 650 can include functionality to automatically archive the data in the email in a customer managed log. Thus, the archiving systems and methods provide dual benefits i.e. limiting data storage in the cloud while honoring data privacy requirements of the customer.

§7.0 Web Transaction Archiving Methods

Figure 7:
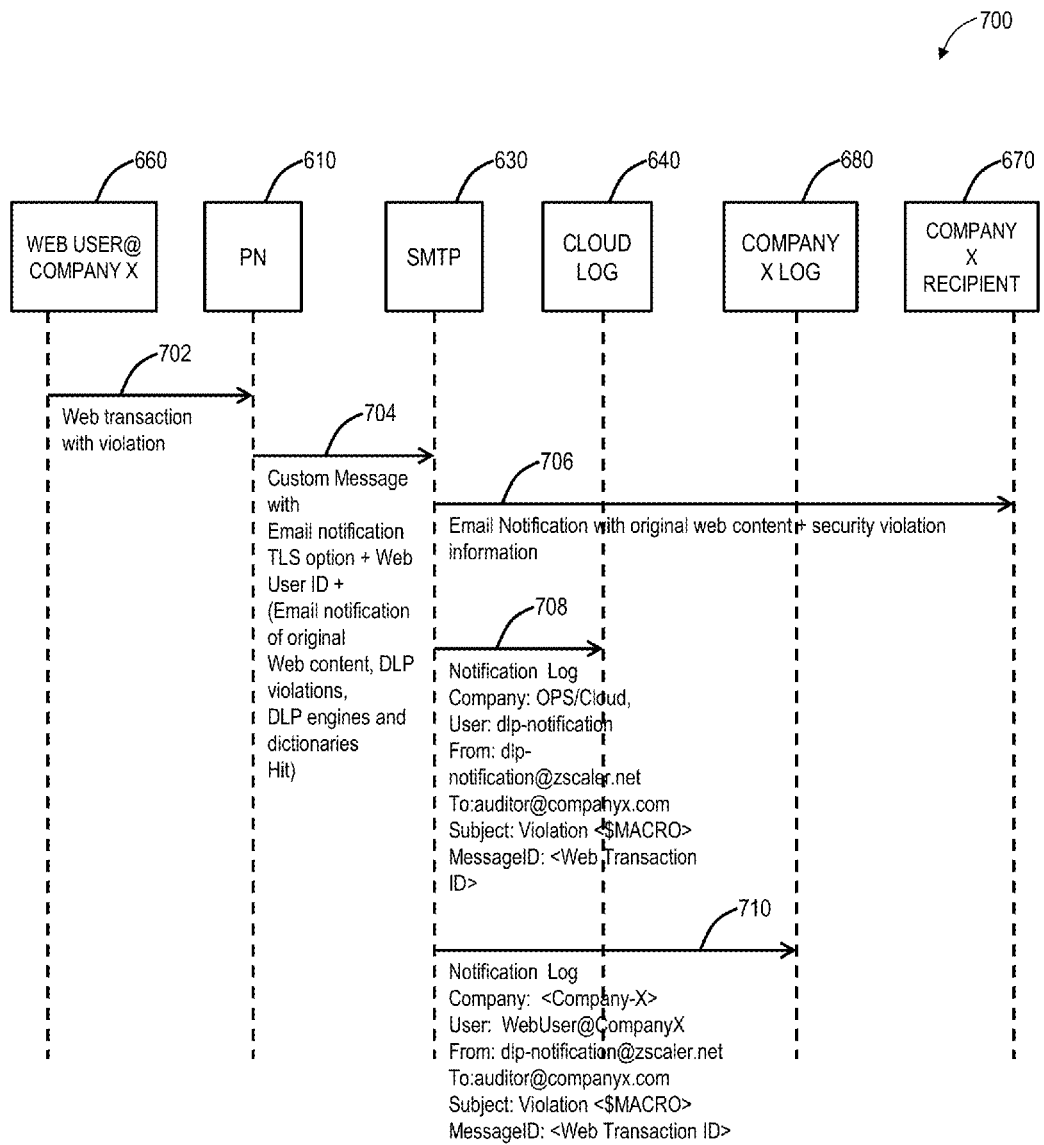
FIG. 7 is a flow diagram of an archiving method.

Referring to FIG. 7, in an exemplary embodiment, a flow diagram illustrates an archiving method 700. The archiving method 700 can be implemented with the web transaction archiving system 600, the cloud system 500, the distributed security system 100, etc. The archiving method 700 is illustrated relative to functions associated with the nodes 610, 630, 640, 650, the end user 660, and a recipient 670 at company X with company X being the organization associated with the end user 660 (i.e., the data belongs to company X). To start, a web transaction (or any data transaction) with a violation is presented to the archiving method 700. Specifically, the archiving method 700 processes outputs from a security processing engine, e.g. such as described herein in the functionality of the processing node 110 and the cloud node 502. The archiving method 700 is presented with content extract which triggers the security event or violation, original content, security policy, etc. The archiving method 700 can be implemented based on a setting or policy of archiving content associated with violations. The cloud processing node 610 detects a web transaction with a violation (step 702). Note, this violation is one in which archiving rules require the data to be stored with company X's domain and not in the cloud. The cloud processing node 610 provides a message to customer SMTP server 650 (step 704).

In an exemplary embodiment, the message is an email notification with Transport Layer Security (TLS) and data including a Web User ID of the user associated with the violation and various data about the violation. Exemplary data about the violation can include the original Web content triggering the violation, Data Leakage Prevention (DLP) violation related data, DLP engines and dictionaries hit, etc. Specifically, the email notification can include meta information of the web transaction, such as, URL; user of the web transaction and, in case USER is not present, a location; type of web transaction such as Social Networking, Web mail, Web post; names of security engine hit; and the like. The email notification can also include the extracted patterns which contribute towards the triggering of a security policy, i.e. the rationale for flagging the transaction as a violation. Thus, original content from Web transaction is attached to the email, and if the content was in file being uploaded then that file is attached to the email. In an exemplary embodiment, the processing node 610 provides the message to customer SMTP server 650 as described above. In another exemplary embodiment, the processing node 610 provides the message to the cloud SMTP server 630 which in turn can provide the message to the customer SMTP server 650. Alternatively, the cloud SMTP server 630 can be integrated with the processing node 610.

The customer SMTP server 650 (or the cloud SMTP server 630) can be configured to perform numerous steps. First, the SMTP server 650 can send a notification (e.g., email, text message, URL, etc.) with the original web content and security violation to a recipient 670 at company X (step 706). For example, the recipient 670 could be someone in IT or some other person responsible for data security and control. The purpose of this notification can be to alert the company X of the violation for any reactive measures to be taken. Next, cloud SMTP server 630 sends a notification to the cloud logging node 640 (step 708). This notification can also be an email message with relevant data that is stored in the cloud, i.e. the relevant data does not include the data stored with company X per the archiving rule. The relevant data is data used by the cloud system for proactive security, i.e. data related to the violation that can be used for subsequent detections of violations. This data may be anonymized as well as excluding the data stored with company X per the archiving rule. The SMTP server 650 can also send a notification to a company X log 680 (step 710). The company X log 680 can reside on the cloud SMTP server 630 or a separate device, and the company X log 680 includes a database of violations. Subsequently, company X, through this database, company X IT can search for violations, view and prepare reports of violations, etc. providing an integrated view for proactive security measures.

Figure 8:
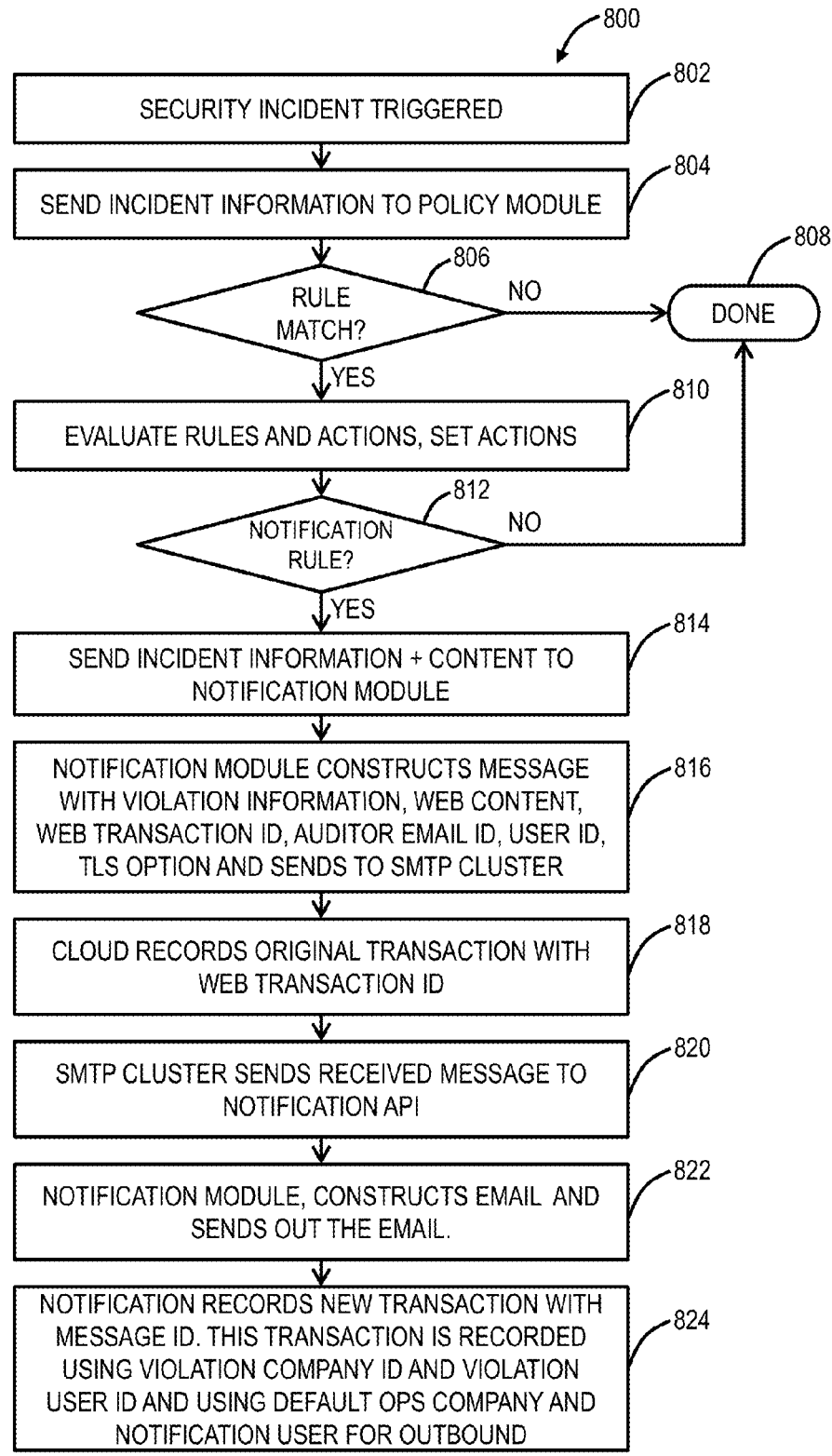
FIG. 8 is a flowchart of another exemplary embodiment of the archiving method of FIG. 7.

Referring to FIG. 8, in an exemplary embodiment, a flowchart illustrates an archiving method 800. The archiving method 800 can be implemented with the web transaction archiving system 600, the cloud system 500, the distributed security system 100, etc. In general, the method 800 can be implemented by a computer, such as the server 300 described herein, through instructions on a computer-readable medium that are executed by the processor 302 to cause the server 300 perform the method 800. First, the method 800 has a security incident triggered (step 802). Exemplary security incidents can include malware, spyware, viruses, trojans, botnets, email spam, policy violations, data leakage, etc. The incident information is sent to a policy module (step 804). Here, an analysis is performed on the incident including checking if there is an archiving rule match (step 806). Archiving rules can be defined per organization per violation type, and can generally define what information is stored in the cloud and what information is securely stored with the organization's domain, i.e. not within the cloud. If there is no archiving rule in place (step 806), the method 800 is complete (step 808). If there is an archiving rule in place (step 806), the method 800 evaluates associated rules and actions based on the incident, and sets actions based thereon (step 810).

The method 800 checks if there is a notification rule (step 812). For example, the method 800 can include two aspects, 1) is there a rule preventing archiving in the cloud, and 2) is there a rule requiring archiving within an organization's domain. These two aspects can be mutually applied. For example, if there is no notification rule (step 812), the method 800 can end (step 808) with the cloud system simply not storing the data related to the incident. If there is a notification rule (step 812), the method 800 can send the incident information and content to a notification module (step 814). The notification module constructs a message with violation information, web content, web transaction ID, auditor contact info, user, info, TLS, etc. and sends the message to an SMTP cluster (step 816). The SMTP cluster can be the cloud SMTP node 630, and generally includes equipment within the cloud to create notifications to the organization. The cloud can record the original transaction with the web transaction ID (step 818). Here, the cloud, e.g. the processing node 610, the cloud SMTP node 630, etc., can log and store information related information while adhering to the rules (e.g., storing incident information without underlying content). The SMTP cluster can send the received message to a notification Application Programming Interface (API) (step 820). The notification module constructs an email based on the received message and sends out the email (step 822). The notification module, in the cloud, records a new transaction based on a message ID (step 824). This transaction, in the cloud, can be recorded using a violation company ID and violation user ID, etc. Further, the transaction can be send out for notification to the company, users, etc. The policy module and the notification module can include physical devices, hardware, software, firmware, etc. to perform the various functions in the method 800.

Figure 9:
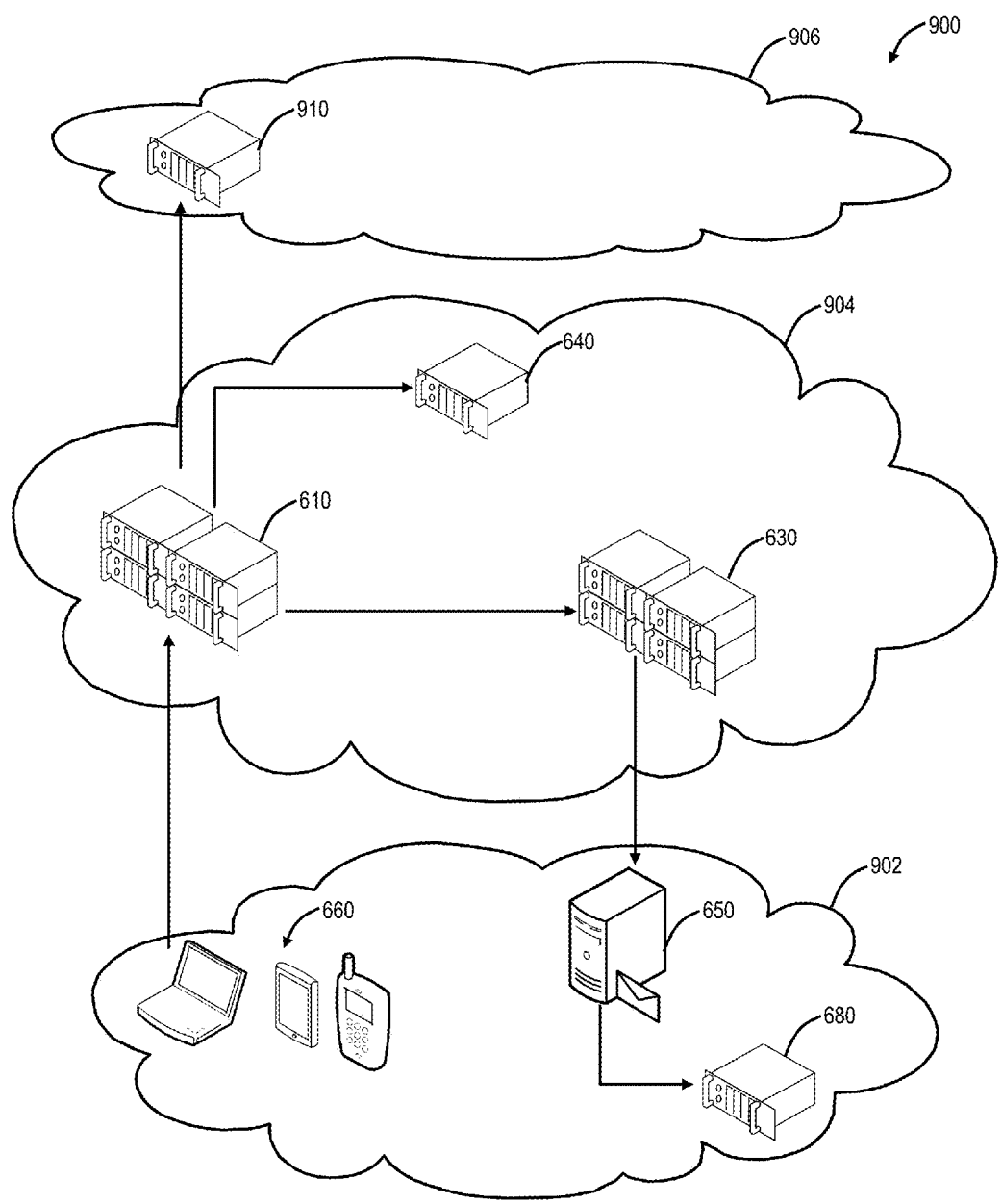
FIG. 9 is a network diagram of a network depicting an exemplary operation of the archiving methods.

Referring to FIG. 9, in an exemplary embodiment, a network diagram illustrates a network 900 depicting an exemplary operation of the archiving methods 700, 800. The network 900 includes an organization's domain 902, a cloud system 904, and an external network 906 (e.g., the Internet). As described herein, the cloud system 904 is an intermediate layer between the domain 902 and the network 906, and the cloud system 904 is configured to implement the archiving systems and methods described herein in conjunction with the domain 902. The domain 902 includes users 660, the SMTP server 650, and, optionally, the company X log 680. The cloud system 604 includes the cloud processing node 610, the cloud SMTP node 630, and the cloud logging node 640. The external network 906 can include a site 910. In operation, a user 660 can access the site 910 through the cloud system 904, specifically through the cloud processing node 610. If there is no violation, the cloud processing node 610 simply acts as a proxy between the site 910 and the user 660. If there is a violation and an associated archiving rule, the cloud processing node 610 is configured to implement the methods 700, 800 with the devices 630, 640, 650, 680 to ensure no private data (per the archiving rule) belonging the organization is stored in the cloud system 904, but rather stored within the domain 902 through the devices 650, 680. In another exemplary embodiment, private data belonging to the organization could be stored in the cloud system 904, but with an approach that ensures this private data is only reviewable or accessible by the organization. For example, the devices 610, 630, 640 could include encrypted storage for storing violation information. This encrypted storage could a use key per organization and encrypt the data using that key before storing the data. Thus while private data is stored in the cloud system 904, it is only accessible with the organization's private key.

In an exemplary embodiment, a cloud based security method includes monitoring data traffic between a user and an external network, wherein monitoring is performed by a processing node including a first server in a cloud based system; detecting a security incident; if an archiving rule exists based on the security incident, providing a notification to a second server within an organization's domain, wherein the user is part of the organization, and wherein the notification includes private data associated with the security incident based on the archiving rule; and storing non-private data in the cloud based system based on the archiving rule. In another exemplary embodiment, a cloud based security system includes a plurality of servers forming a cloud system; a processing module executed on the plurality of servers to detect security incidents in data communications between users and an external network; a policy module executed on the plurality of servers to determine archiving rules associated with detected security incidents; and a notification module executed on the plurality of servers to provide notification of private data associated with the detected security incidents based on the archiving rules for storage within an associated organization's domain. In yet another exemplary embodiment, a processing node in a cloud based system includes a network interface communicatively coupled to a user and an external network; a processor; and memory storing computer executable instructions, and in response to execution by the processor, the computer executable instructions cause the processing node to perform steps of: monitoring data traffic between the user and the external network; detecting a security incident; if an archiving rule exists based on the security incident, providing a notification to a server within an organization's domain, wherein the user is part of the organization, and wherein the notification includes private data associated with the security incident based on the archiving rule; and storing non-private data based on the archiving rule.

§8.0 Out of Band Notification System and Method

Figure 10:
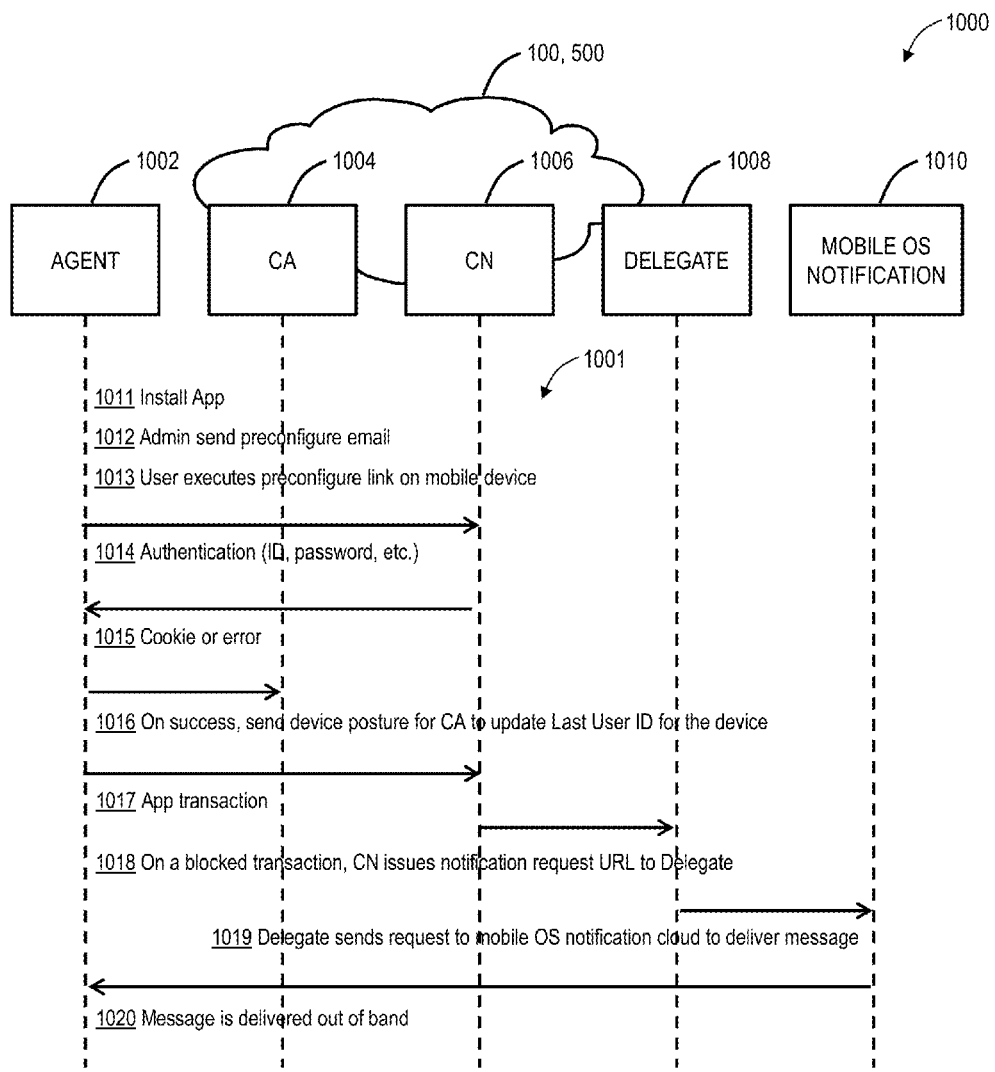
FIG. 10 is a flow diagram of an out of band notification system and method.

Referring to FIG. 10, in an exemplary embodiment, a flow diagram illustrates an out of band notification system 1000 and method 1001. The notification system 1000 includes an agent 1002, a central authority (CA) 1004, a cloud node (CN) 1006, a delegate 1008, and a mobile operating system (OS) notification cloud 1010. Collectively, the devices 1004, 1006, 1008 can be part of the distributed security system 100, the cloud system 500, etc. The agent 1002 is a software program or app that is installed and operated on the mobile device 400. The agent 1002 can have various functionality such as authentication with the systems 100, 500, end user notification (EUN), and the like. Additionally, the agent 1002 can be distributed or installed through mobile OS-specific mechanisms such as Google Play (Android Marketplace), Apple App Store, Windows Marketplace, etc. The CA 1004 is a central authority (CA) server which can be used by the systems 100, 500 to track users. The CN 1006 can be the processing node 110 in the system 100 or the cloud node 502 in the system 500.

The method 1001 includes installing the agent 1002, such as an app on the mobile device 400 (step 1011). This can be done via the mobile OS-specific mechanisms or the like. An administrator sends a preconfigured email to the mobile device 400 (step 1012) and the user executes a preconfigured link or the like in the email on the mobile device 400 (step 1013). These steps configure the agent 1002 with the specific user and associated policy in the system 100, 500. Once configured and operating, the user can perform authentication such as with the agent 1002 through the cloud node 1006 (step 1014). The authentication can be anything known in the art, e.g. User ID and password, etc. The cloud node 1006 responds with a cookie (if successful) or error (if not successful) (step 1015). If the authentication is successful, a device posture is sent to the CA 1004 to update the last User ID for the mobile device 400 (step 1016). This is to create a User ID to IP binding as is described herein such that the system 100, 500 can know who is using the mobile device 400.

The method 1001 can include initiating a mobile app transaction (step 1017). If the mobile app transaction complies with relevant policy, does not contain malware, etc., the method 1001 would end here and the mobile app transaction would be successful. If the mobile app transaction is not successful, e.g., blocked, cautioned, etc., the CN 1006 can send a notification request URL to the delegate 1008 (step 1018). The delegate 1008 sends the request to the mobile OS notification cloud 1010 (step 1019), and the message can be delivered to the mobile device out of band (step 1020).

In the context of mobile security—through the systems 100, 500 and with the mobile device 400 operating the agent 1002, there are various deployment and use cases. For example, there are three exemplary deployments where mobile security can be enabled, namely:
1. Surrogate IP within enterprise (GRE without Network Address Translation (NAT)) (Bring your own device)
2. Global Proxy (Company Owned Device)
3. Mobile VPN §8.1 Surrogate IP within Enterprise (GRE without NAT)

With surrogate IP, the user on the mobile device 400 has to login once through a browser. With this verified credential, a gateway (e.g., the CA 1004) creates a mapping of the user to the IP. Note, the CA 1004 can be the processing node 110 or the authority node 120. App traffic that does not have ability to perform cloud authentication, now can be authenticated using the newly built User to IP mapping. The cloud (the systems 100, 500) can now enforce policy on App traffic as well. In this use case, there is a need for a clean login and logout feature that helps setting up User to IP binding. Once the User to IP binding is established in the CA 1004, the system 100 can enforce policy based thereon.

Again, when App traffic is blocked by the cloud such as based on configured Admin policy, the block message sent in response to the blocked request is not rendered by the apps. This is not user friendly and there is a need to send some notification to user on the mobile device 400 regarding blocked transaction. The agent 1002 solves these issued by authentication the CN 1006 creating the User to IP mapping. As a part of the EUN feature, the agent 1002 will register with Apple, Google and Windows Push notification services, i.e. the mobile OS notification cloud 1010.

After successful authentication app will obtain user cookie and will register with the CA 1004—the respective tokens and related device information along with user's ID. At this point, the cloud has mapping of user to device token. Now when EUN has to be sent to a specific user, the systems 100, 500 cloud can look up the user<->device mapping and send appropriate notifications using the mobile OS notification cloud 1010, e.g. the Apple or Google push notification infrastructure.

§8.2 Global Proxy

With the Global proxy, each request from a mobile device will carry 407 credentials for user identification. The EUN functionality is needed as explained in previous section of surrogate IP. In this case, the function of authentication will be limited to getting the user cookie and registering with the CA 1004—the device mappings to user. These mappings will be used to send notification as explained in previous section.

§8.3 Mobile VPN

With Mobile VPN, user credentials are embedded in an IPSec VPN tunnel. As with other two deployments, the EUN functionality is needed. In this case, the function of authentication is limited to getting the user cookie and registering the device mappings to user with the CA 1004. These mappings will be used to send EUN notification as descripted above.

§8.4 Delegate

The delegate 1008 is a group of application servers located outside of customer cloud that can handle two major roles. One is to maintain CCM (customer-cloud mapping) and the other is to handle the notification to servers provided by mobile OS platform such as Apple Push Notification Service (APNS), Google Cloud Messaging (GCM) for Android, and Windows Push Notification Service (WPNS) for the mobile OS notification cloud 1010. The CCM is persisted as data within delegate 1008 domain and will be initially populated by the delegate 1008. More importantly, the delegate 1008 will implement the following three HTTP commands as main application programming interfaces (API), namely 1) CCM lookup API, 2) Update CCM entry update API, 3) Request Notification API.

§8.5 Pre-Configuration of the Agent

An App specific scheme can be used to pre configure primarily. A customer admin can generate a welcome email to their user and the user will execute the link in the mobile devices. The URL is designed to launch the secure agent 1002 app and will fill the passed information accordingly. The preconfigure URL can include the following information: user name and cloud info.

§8.6 AUL (Authorized User List)

The secure agent 1002 can be designed to work with the latest multi-user enabled mobile devices such as Nexus 10 or Surface. To do this, the secure agent 1002 maintains an "authorized user list" called AUL as encrypted data under the app folder with the same lifetime of app. This means if app is uninstalled, the user needs to be authorized again.

§8.7 Cloud Authentication

Authentication takes places in two steps internally although it still looks as one from the end user's point of view. The first step is authorization through the gateway of cloud to acquire cookie and IP surrogate information just like a secure browser. For example, through the systems 100, 500. The second step is to send cookie, device ID for each mobile OS notification such as device token for APNS, GCM, WPNS, AUL and more collected device posture information and scanned app list to the CA 1004 for update purpose. Whoever logs in, the secure agent 1002 always sends the whole AUL to the CA 1004 to ensure AUL is up to date in server side too. So the CA 1004 must differentiate its own data with client data and update its database accordingly. A log out from app will also clear current user from AUL.

§8.8 User & Device Information Database

The CA 1004 can maintain database information for each user and each device. For the user, the CA 1004 can maintain information related to User ID, login name, password, role (access list, department, organization), restrictions, updates, statistics, etc. For the device, the CA 1004 can maintain information such as device type, OS version, OS type, device model, applications, MAC address, etc. The CA 1004 can also maintain a list of apps installed on the device. For example, device_type codes could include:

00 Others
01 iPhone/iPod touch
02 iPad
03 Android Mobile
04 Android Tablet
05 Windows Mobile
06 Surface
07 Blackberry
08 Ubuntu Mobile
09 Desktop For example, OS type codes could include:

00 Others
01 iOS
02 Android OS
03 Windows Mobile OS
04 Blackberry OS
05 Ubuntu for Phone
06 Mac OS X
07 Windows
08 Linux The CA 1004 will maintain last User ID (LUI) per device to ensure that notification is delivered only to the associated device. LUI will be maintained in device info table by upon successful authentication.

§8.9 EUN Send and Handling

The delegate 1008 will be responsible to maintain a connection to proprietary notification servers from mobile OS such as APNS, GCM and WPNS and will handle the cloud systems 100, 500 direct or indirect notification URL API requests. The delegate 1008 also takes suppression information originated from the cloud systems 100, 500 and implement the logic accordingly.

§9.0 Design and Implementation

Figure 11:
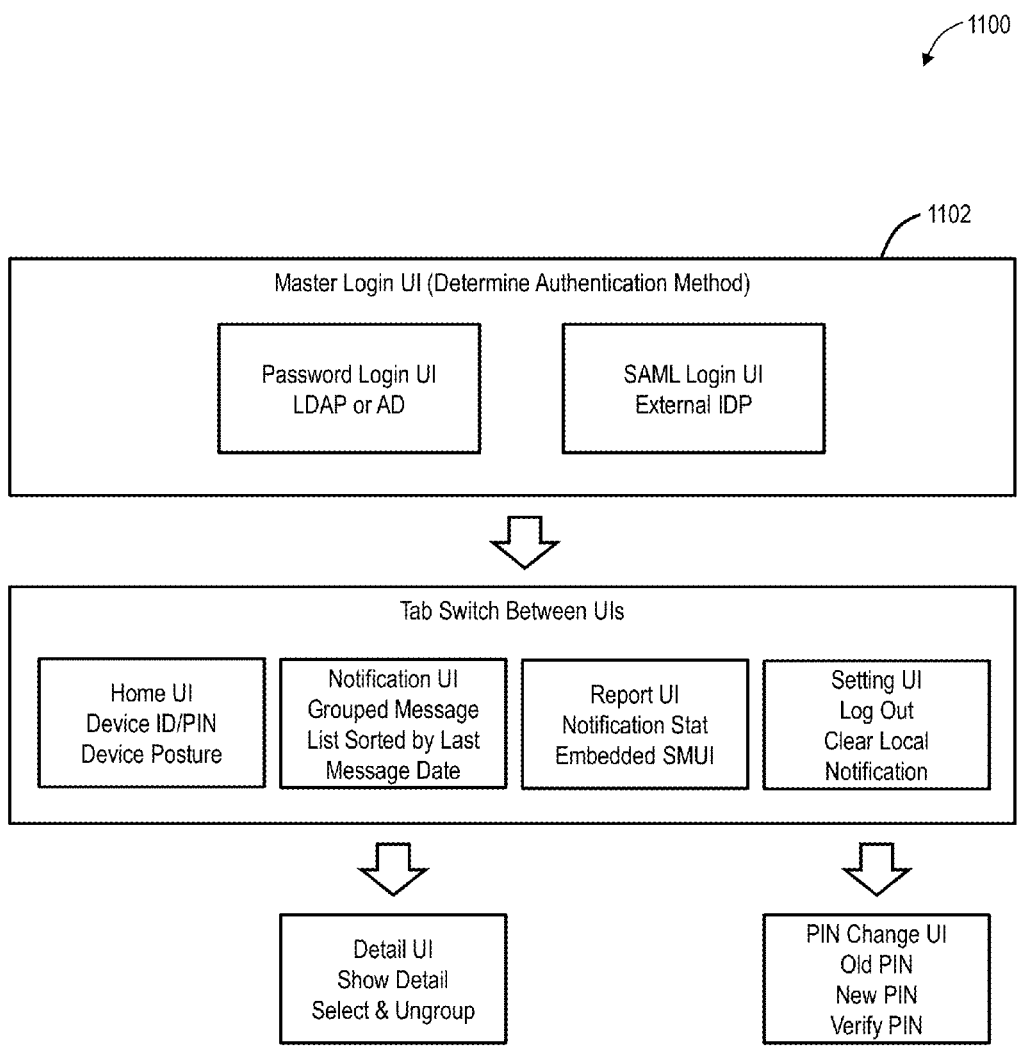
FIG. 11 is block diagram of a user interface for the out of band notification system of FIG. 11.

Referring to FIG. 11, in an exemplary embodiment, a block diagram illustrates a user interface (UI) 1100 for the out of band notification system 1000 of FIG. 10. The UI 1100 includes a master login U 1102 with a username that determines a login mechanism per user configuration, namely either i) a Lightweight Directory Access Protocol (LDAP) or Active Directory (AD) password login UI or ii)

a Security Assertion Markup Language (SAML) password login UI using an external Identity Provider (IDP).

For SAML, in general, when client tries to open any page, it redirects to a URL, e.g., gateway.zscaler.net and then user should fill username and if he/she is a SAML user, gateway does not ask for his password but redirects to a SAML server for authentication, then the custom SAML page does the authentication per company's implementation. In the secure agent 1002, after SAML detection, the login UI will be dismissed and username for company SAML implementation will be entered automatically, with which was entered from the previous login UI.

For the creation of device to User mapping, the CA 1004 performs the functions of 1) managing LLU (last login user) information after user authentication, 2) updating device posture information of in a device info table, 3) synchronizing with the CN 1006 with additional mobile notification related information in user configuration information, and 4) updating an array of app_ids on the device. The CA 1004 has an API with the secure agent 1002, e.g. HTTP (443) request with POST with contents and names and value pairs. The API can include command type and cookie information to 1) update device posture (command type=01): API will contain cookie and command type (=01) along with all device information of device info table except app_id array; 2) update installed App Ids (command type=02), and 3) a hash message authentication code (HMAC) for security.

The secure agent 1002 uses the HTTP API to talk to the CA 1004. All calls are made over https with POST method. The full protocol is described as follows. There are two end-points defined on the CA 1004, one for provisioning and registering a device and one for logging-out and de-registering a device (and its user). Provisioning end-point will be /dev_api/add. Method POST and on registration, the CA 1004 will add the device and return the device_id in the same request message format. Logout end-point will be /dev_api/del. Method POST and on logout, the CA 1004 will dis-associate the device and the user. Further transactions from this device will not be associated to this user (for logs or notification) until user does a re-provisioning. All messages will be in the form of multiple [type][length][value] triads. [2 byte Type][2 byte Length][Variable length value]. A protocol version type will identify the protocol the secure agent 1002 is talking with the CA 1004. In future, any major changes to the message protocol and the version number will could be incremented (e.g. device_type becomes string from integer). The CA 1004 can return error on a version mismatch. Any unknown type will be ignored and processing will move to next type (as long as versions are same) so that secure agent 1002 changes can be done independently without breaking the CA 1004 protocol.

Strings can be of variable-length without the '\0' character. Integers can be of 4-byte length, multi-byte data-types can use little-endian format, and all the command-types can be defined in a shared-header file and generated when the CA 1004 is built and shared by the mobile code. For example, to provision a device:
[PROTOCOL_VERSION][4][0x1][COOKIE_TYPE][13] [abcXXXxxxXXXD][TS_TYPE] [4][0 x55051451][DEV_TYPE][4][0x1][DEV_NAME] [12] [Joe's IPhone] etc.

The CA 1004 can perform the following actions when it receives the message. First, the CA 1004 will parse and validate the version and timestamp; the timestamp is expected to be in UNIX time format (so will be an integer type) and no more than 5 minutes of skew is allowed from current-time on the CA 1004. Next, a cookie is validated and userID is extracted from the cookie. The message is parsed and the device is updated or newly added. The notification key will be used to check if it is an device update or a new device provisioning—if notification_key exists, the CA 1004 will update the device with any changes needed for e.g. os_type, udid, lastuserid, jailbreak, etc.; or if the notification_key does not exist, the CA 1004 will create a new device record for this userid. (It is rare for the notification key to change for the same device).

After processing the message, the CA 1004 will either send a Success 200 OK message with the device_id or a 500 Internal Error with an error code. The secure agent 1004 should re-try provisioning on error. For de-provisioning, the CA 1004 will dis-associate the given userid and deviceid. A flush is sent to the CN 1006 to forget the dis-associated device's notification_key.

§9.1 iOS Global Proxy Configuration

The secure agent 1004 provisioning message will also be used to provision the iOS Global Proxy user & password. The device_id is the identity of the device; primary key in the CA 1004 database; and returned by the CA 1004 after provisioning of device. The device_login is the login_name that will be used for iOS Global Proxy authentication. It will be of the form <device_id>@<domain>. This will be returned from the CA 1004 after provisioning. For example, 1000@cokecce.com [1000 is device ID. cokecce.com is domain of the user]. The device_password is the auto-generated password for the device and is generated by the CA 1004 and returned after provisioning.

The CA 1004 will define an end-point for changing the device_password. /dev_api/chg Input will be the device_id, old device_password and the new device_password requested. Cookie and valid timestamp are required in the message.

§9.2 UI Flow

In FIG. 11, login UI flow will be two phases. Master login UI will determine the authentication mechanisms. Then either password login UI just like safe browser or SAML login UI will show. A Home UI will have copy button both for display ID and PIN. A Notification UI is be placed the second place in tab over report UI. It will show notification list grouped by app. The CN 1006 will set app name as "Other App" in case app mapping to user-agent is not discovered yet. A Detail UI will display the detail information of the latest message among selected app group. There is a "more message" button that leads to show the previous list of message. Upon selection among previous ones, detail information will be refreshed with selected previous message. There is also "email" button to share notification detail through email.

A Report UI, instead of showing stat from locally stored notification, it will embed UI like web UI to show stat from server. Local database will have only cached one which can be also deleted by user in setting UI so that it's not that useful stat. In setting UI, "Clear local notification" button will remain as in your document.

§10.0 Configuration

Again, the delegate 1008 connects to the mobile OS notification cloud 1010. The GCM Server will register android device and send registration ID to device. This registration ID will be forwarded by device to the CA 1004. Maximum size of registration ID can be 4 KB. For example, a registration ID will look like "APA91bHun4MxP5egoKMwt2KZFBaFUH-1RYqx . . . " To allow connectivity with GCM, Organization needs to open ports 5228, 5229 and 5230. GCM typically only uses 5228, but it sometimes uses 5229 and 5230. The delegate 1008 is able to fire off HTTPS requests to the GCM server.

It should have API key to communicate with GCM and registration id to send notifications to particular device through GCM. API key should be included in the header of POST requests.

The following table provides exemplary details for the mobile OS notification cloud 1010:

|  | GCM | APNS | WPNS |
|---|---|---|---|
| Registration ID size | Can grow up to 4 KB, no fix size | 32 bytes as of now, but can grow up to 4K | URI is used as ID, size cannot exceeded 2055 bytes. |
| Ports to open | 5228, 5229, and 5230. GCM typically only uses 5228, but it sometimes uses 5229 and 5230. GCM doesn't provide specific IPs. It changes IPs frequently. | TCP port 5223 (used by devices to communicate to the APNs servers) TCP port 2195 (used to send notifications to the APNs) TCP port 2196 (used by the APNs feedback service) TCP Port 443 (used as a fall back on Wi-Fi only, when devices are unable to communicate to APNs on port 5223) The APNs servers use load balancing. Devices will not always connect to the same public IP address for notifications. The entire 17.0.0.0/8 address block is assigned to Apple, so it's best to allow this range in firewall settings. | For notification to work correctly for Windows Phone or iOS devices, firewall rules must allow port 443/TCP inbound and outbound and port 5223/TCP outbound. |

Figure 12:
FIG. 12 is a screen shot of an exemplary out of band notification.

Referring to FIG. 12, in an exemplary embodiment, a screen shot illustrates an exemplary out-of-band notification to a mobile device. Note, the out-of-band notification provides the end user information as to what was blocked and why as well as contact information if the user believes that the block was in error.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A cloud based security method, comprising:
   authenticating a mobile device through a cloud based security system via a secure agent on the mobile device;
   associating the mobile device with a user of the cloud based security system based on the authenticating;
   monitoring user requests from the mobile device by the cloud based security system, wherein the user requests are for non-browser mobile applications executed on the mobile device;
   detecting security threats in the non-browser mobile applications based on the monitoring; and
   sending an out of band end user notification to the mobile device responsive to detecting a security threat, wherein the out of band end user notification comprises information for the user related to the security threat, wherein the out of band end user notification is sent to the mobile device separate from the non-browser mobile application to notify the user of the security threats through steps of:
      sending a notification to a delegate server from the cloud based security system with associated data for a push notification to the mobile device;
      determining the user for the push notification from a first mapping of the user to the cloud based security system and determining the mobile device from a second mapping of the user to the mobile device using the secure agent;

instructing a mobile Operation System platform associated with the mobile device to send the push notification to the mobile device based on the notification and the second mapping, wherein the push notification is sent to the mobile device by the mobile Operation System platform based on the instructing and the push notification is out-of-band from the cloud based security system.

2. The cloud based security method of claim 1, further comprising:

detecting the security threats comprising any of malware, spyware, viruses, trojans, botnets, email spam, data leakage, and policy violations.

3. The cloud based security method of claim 1, wherein the non-browser mobile device applications are unable to display Hypertext Transfer Protocol (HTTP) responses for an end user notification.

4. The cloud based security method of claim 1, further comprising:

providing the secure agent to the mobile device.

5. The cloud based security method of claim 4, further comprising:

authenticating the mobile device through a cloud based security system; and utilizing the secure agent operating on the mobile device to map information associated with the mobile device and user to the cloud based security system.

6. The cloud based security method of claim 5, further comprising:

maintaining database information for the mobile device and the user by the cloud based security system through communication with the secure agent.

7. A cloud based security system, comprising:

a central authority (CA) server, a cloud node (CN), and a delegate server communicatively coupled to a mobile operating system notification system, wherein each of the one or more CA servers, the one or more cloud nodes, and the delegate server are communicatively coupled to one another and each comprise at least one computer processor and memory;

wherein the cloud node, using software executed by the at least one computer processor, is configured to:

authenticate a mobile device, wherein the CA server is configured to associate a user of the mobile device based on authentication for a first mapping of the user to the cloud node and a second mapping of the user to the mobile device;

monitor user requests from the mobile device, the user requests are for non-browser mobile applications executed on the mobile device, and upon detection of a security threat, provide a request to the delegate server;

wherein the delegate server is configured to:

receive the request from the cloud node with associated data for a push notification to the mobile device, determine the user for the push notification from the first mapping and the mobile device from the second mapping;

instruct a mobile Operation System platform associated with the mobile device to send the push notification to the mobile device based on the notification and the second mapping, wherein the push notification is sent to the mobile device by the mobile Operation System platform based thereon and the push notification is out-of-band from the cloud based security system, wherein the push notification is sent to the mobile device separate from the non-browser mobile application to notify the user of the security threats, wherein the cloud node utilizes the secure agent to authenticate the mobile device and the CA server uses the secure agent to map information associated with the mobile device and user.

8. The cloud based security system of claim 7, wherein the cloud node is configured to detect the security threats comprising any of malware, spyware, viruses, trojans, botnets, email spam, data leakage, and policy violations.

9. The cloud based security system of claim 7, wherein the non-browser mobile device applications are unable to display Hypertext Transfer Protocol (HTTP) responses for an end user notification.

10. The cloud based security system of claim 7, wherein the mobile device comprises a secure agent operating thereon.

11. A mobile device, comprising:

a network interface communicatively coupled to a user and an external network;

a computer processor; and memory storing computer executable instructions, and in response to execution by the processor, the computer executable instructions cause the computer processor to perform steps of:

operate a secure agent associated with a cloud based security system;

operate a non-browser mobile device application unable to display Hypertext Transfer Protocol (HTTP) responses for an end user notification;

authenticate with the cloud based security system via the secure agent, wherein the cloud based security system performs a first mapping of the user to the cloud based security system and a second mapping of the user to the mobile device using the secure agent;

receive the end user notification out of band from a mobile operating system notification system responsive to the cloud based security system detecting a security threat with the non-browser mobile device application, wherein the out of band end user notification is sent to the mobile device separate from the non-browser mobile applications as a push notification to notify the user of the security threats; and display the end user notification separate from the non-browser mobile device application, wherein the cloud based security system sends the end user notification to a delegate server which uses the first mapping and the second mapping to instruct a mobile Operation System platform to send the push notification based on the notification and the push notification is out-of-band from the cloud based security system.

12. The mobile device of claim 11, wherein the security threats comprise any of malware, spyware, viruses, trojans, botnets, email spam, data leakage, and policy violations.

* * * * *